Nov. 6, 1928.
H. C. A. MEYER
1,690,646
MOTOR CONTROL MECHANISM
Filed March 31, 1925        2 Sheets-Sheet 1
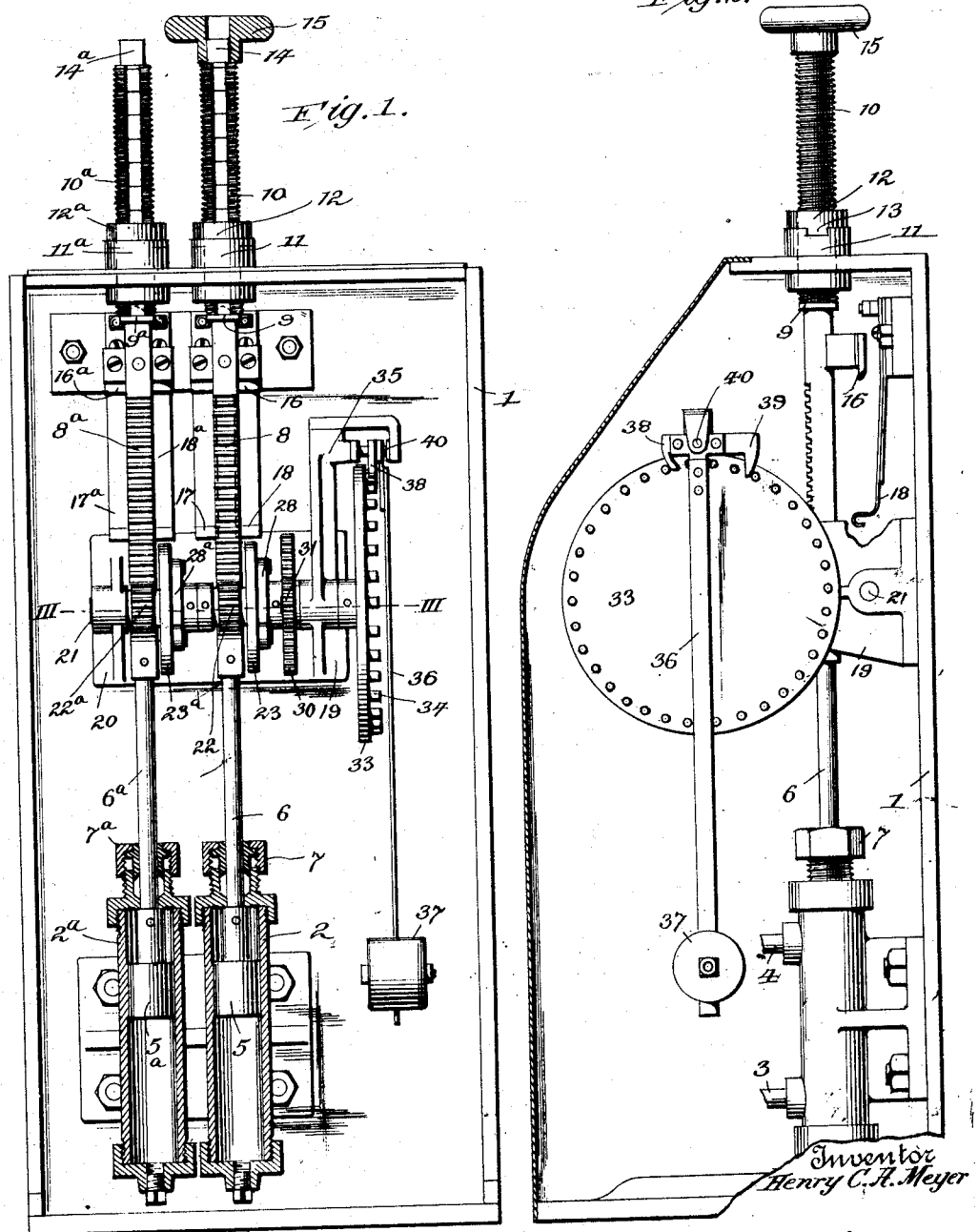

Nov. 6, 1928.
H. C. A. MEYER
1,690,646
MOTOR CONTROL MECHANISM
Filed March 31, 1925  2 Sheets-Sheet 2
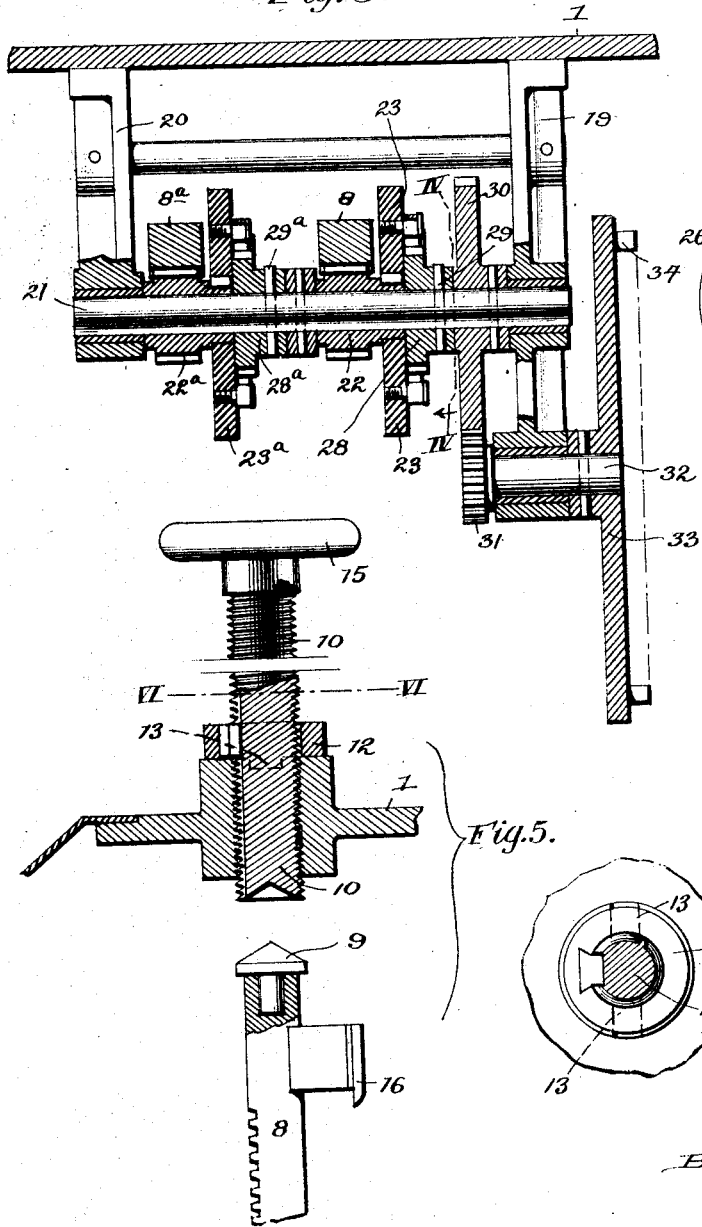

Patented Nov. 6, 1928.

1,690,646

UNITED STATES PATENT OFFICE.

HENRY C. A. MEYER, OF BALTIMORE, MARYLAND, ASSIGNOR TO THE BARTLETT HAYWARD COMPANY, OF BALTIMORE, MARYLAND, A CORPORATION OF MARYLAND.

MOTOR-CONTROL MECHANISM.

Application filed March 31, 1925. Serial No. 19,750.

This invention pertains to motor control mechanism, the same being especially designed for the making and breaking of circuits, which latter in turn control other instrumentalities, such for instance as motors or the like employed in gas producer sets.

The invention is illustrated in connection with two hydraulic motors which derive fluid under pressure to operate them from the mains of the main control valves of the producer set, commonly known as the Critchlow valves or units. The main object of the invention is to provide means for ensuring a constant speed control for the motor which means derives its power from the motor, whereby a fixed and predetermined interval of time will ensue between the initiation of the stroke of the motor and the closing of the circuit thereby. Inasmuch as the length of stroke of the motor may be adjusted, the time interval between the beginning of the stroke and the making of the circuit may be regulated as desired or necessary.

One embodiment of the invention illustrating two cylinders and their allied parts operating in conjunction with a common speed control device is illustrated in the annexed drawings wherein:

Fig. 1 is a sectional elevation of the structure, with the cover of the enclosing casing removed;

Fig. 2 a side elevation therof, the casing being in section;

Fig. 3 a horizontal sectional view taken on the line III—III of Fig. 1;

Fig. 4 a detail sectional view on the line IV—IV of Fig. 3;

Fig. 5 a detail sectional view of a portion of the actuating rack and the adjustable stop employed to limit or regulate the movement, and Fig. 6 a horizontal section on the line VI—VI of Fig. 5.

While the invention is shown in conjunction with two motors or cylinders, a greater or less number may be employed as will be apparent from the following description.

In the drawings, 1 denotes a fixed casing or support to which is secured two motor cylinders 2 and 2ª. Inasmuch as the motors and their operative parts are duplicates throughout, reference will be had only to one of such mechanisms, and the other will be similarly lettered with the added exponent "a."

Suitable pipes as 3 and 4 (Fig. 2) open into the upper and lower ends of the cylinder respectively, and are designed to be connected to the mains of the corresponding Critchlow unit of the gas set, so that fluid under pressure may be admitted to the pipe 3 and exhausted from the pipe 4, or, conversely, may be allowed to exhaust from the pipe 3 and run into the pipe 4, dependent upon whether the piston is moving up or down. The piston is denoted by 5, and the piston rod 6 extends upwardly therefrom and through a suitable stuffing box or gland 7 secured to the upper end of the cylinder. To the upper end of the rod there is secured a rack bar 8. The upper end of the rack bar is designed to abut an adjustable limit stop, and to this end the upper end of the bar is preferably provided with a coned cap piece 9 which takes against the lower cupped end of a threaded stem 10. Said stem, as will best be seen upon reference to Fig. 5, is threaded into a bushing or enlargement 11, shown as formed as an integral part of the upper portion of the casing 1. A lock nut 12 is splined upon the stem 10 and is provided on its under-face with lugs 13 adapted to enter rests formed in the upper portion of the threaded bushing or enlargement 11. The upper end of the threaded stem 10 is squared as at 14 to receive a hand-wheel 15 by which the stem may be raised or lowered as desired. Rack bar 8 has secured to it but insulated therefrom the circuit bridging element 16 adapted when the rack is in its lowest position to contact the free ends of two spring terminals 17 and 18, and to thereby establish the circuit through such members, which circuit is broken immediately the bridging element 16 moves upwardly out of contact with said members 17 and 18. The circuit which is thus established through the members 17 and 18 may lead to any suitable valve controlling mechanism, and will be found especially applicable to the control of valves or motors which in turn operate or control the valves of a gas producer set. As will be appreciated by those skilled in the gas-making art, the period of time that a valve,—carbureter, blast, steam, or the like,— must be left open is of the greatest importance, and the present mechanism is found to be highly efficient for the purpose just specified.

Mounted upon the inner wall of the casing 1 is a pair of brackets 19 and 20, which form the support for a shaft 21 mounted for rotation in suitable bearings. Said shaft has loosely mounted thereon, in line with the rack 8, a pinion 22, said pinion being provided with an elongated hub to which there is keyed a disk 23, which in effect forms a carrier for the pawls 24 and 25 (Fig. 4), which are pivoted upon studs 26 and 27 respectively, which are threaded into the disk. Said pawls are spring-pressed inwardly and are designed to co-operate with the teeth of a ratchet wheel 28, said ratchet wheel being secured to the shaft 21 by a pin 29 passing through the hub of the ratchet wheel and the shaft. These parts as above noted are duplicated for the other rack. Upon an upward movement of either rack, say rack 8, rotative motion will be imparted to pinion 22 and pawl carrier 23 about shaft 21, the pawls riding over the teeth of the ratchet wheel. Secured to the shaft 21, adjacent one end thereof, is a large gear 30, said gear being in mesh with a pinion 31 secured to a shaft 32 mounted in a bearing formed at the outer end of the support 19, the shaft 32 at its outer end having fixed thereon a disk 33. Said disk is provided with a series of pins 34, which extend outwardly from the face thereof. Support 19 is provided with an upward extension 35 (Fig. 1), and pivotally mounted at the upper portion thereof is a pendulum bar 36 which has secured to its lower end a weight 37. The pendulum is provided at its upper end with a pair of arms 38 and 39, the outer camming or propelling faces of which are struck upon a curve with the pivotal point 40 of the pendulum as a center. When the pendulum is at rest as shown in Fig. 2, both of the camming faces are in contact with the adjacent pins 34 of the pin wheel or disk 33.

In operation and assuming that the rack 8 is in its lowermost position, fluid under pressure passing into the pipe 3 will force the piston 5 upwardly. In so doing, the rack 8 imparts rotative movement to the pinion 22 in a counter-clockwise direction when viewed from the right-hand side, and as a consequence will impart a similar motion to the pawl carrier 23, the pawls at such time riding over the ratchet teeth and permitting the shaft 21 to remain at rest. When the pipe 3 is opened and pressure admitted to the pipe 4, a reverse movement of the parts is effected. The motor tends to draw the rack downwardly, imparting motion to the pinion 22, and the pawl carrier 23, which then moves in a clockwise direction as viewed in Fig. 4, and from the right in Fig. 3, the pawls 24 and 25 engaging the teeth of the ratchet 28 and driving shaft 21 in a clockwise direction, imparting motion to the gear 30, through it to the pinion 31, shaft 32, and pin-wheel 33. The pins 34 of the pin wheel acting upon the cam or propelling faces of the arms 38 and 39 set the pendulum in motion and retard or restrain the downward movement of the rack. The pendulum and its allied parts therefore form what may be termed a constant speed-retarding mechanism for the motor and consequently for the rack, and a given period of time will elapse between the starting of such downward movement of the rack and the contact of the circuit closing member 16 with the spring contacts 17 and 18. By adjusting the screw stem 10, the degree of upward movement of the rack may be regulated, and consequently the time interval of downward movement likewise regulated. Either rack may be moved upwardly independently of the other, and by reason of the fact that in the upward movement the pawls override the ratchet teeth, the quick upward movement of either rack may be effected.

Additional hydraulic operating cylinders may be mounted and connected hydraulically as required, with suitable contact either at the top or at the bottom, or both, as required. The upper contacts are omitted from the drawing for the sake of clarity.

What is claimed is:

1. In a motor control mechanism, the combination of a reversible fluid pressure motor; a constant speed control therefor; and connections between the motor and said speed control for bringing the latter into operation only during one portion of the motor stroke.

2. In a motor control mechanism, the combination of a reversible fluid pressure motor; a constant speed control therefor; and connections between the motor and said control embodying gearing including a pawl and ratchet mechanism whereby the motor control is driven by and is effective to control the speed of the motor during the movement of the motor in one direction only.

3. In a motor control mechanism, the combination of a reversible fluid pressure motor; a pendulum; a pin wheel; a pair of camming arms attached to the pendulum, and co-operating with the pins to initiate and effect a swinging of the pendulum upon rotation of the pin wheel; and driving connections between the wheel and motor serving to rotate the wheel when the motor is moved in one direction only.

4. In a motor control mechanism, the combination of a reversible fluid pressure motor; a pendulum; a pin wheel; a pair of camming arms attached to the pendulum, and co-operating with the pins to effect a swinging of the pendulum upon rotation of the pin wheel; and driving connections, including a pawl and ratchet mechanism, between the wheel and motor serving to rotate the wheel when the motor is moved in one direction only.

5. In a mechanism to produce a given time interval of movement between two parts, one of which is fixed, the combination of a reciprocating fluid pressure motor actuated element carrying the other of said parts; and a constant speed control for the motor actuated by the latter during that stroke of the motor the time of which is to be controlled.

6. In a mechanism to produce a given time interval of movement between two parts, one of which is fixed; the combination of a reciprocating fluid pressure motor actuated element carrying the other of said parts; a constant speed control for the motor actuated by the latter; and driving connections between the motor and the speed control, said connections involving means allowing the motor to run free during that stroke which tends to separate the two parts aforesaid.

7. In a mechanism to produce a given time interval of movement between two parts, one of which is fixed; the combination of a reciprocating fluid pressure motor actuated element carrying the other of said parts; a constant speed control for the motor actuated by the latter; driving connections between the motor and the speed control, said connections involving means allowing the motor to run free during that stroke which tends to separate the two parts aforesaid; and adjustable means acting to limit such stroke.

8. In a motor control mechanism, the combination of a fluid pressure motor of the reciprocating type; a rack bar carried by the piston rod of said motor; adjustable means to limit the motion of said bar in one direction; a constant speed control for the motor actuated by the latter; and driving connections intermediate said constant speed control and the rack bar embodying a ratchet mechanism allowing free movement of the piston rod and rack toward the stop.

9. In a motor control mechanism, the combination of a fluid pressure motor of the reciprocating type; a rack bar secured to the piston rod of said motor; an adjustable stop serving to limit the movement of the rod and rack in one direction; a shaft mounted for rotation; a pinion loosely mounted on the shaft and engaging the rack; a pin wheel; a pendulum; camming arms secured to the pendulum and adapted to co-operate with the pins on the pin wheel; and gearing intermediate said pin wheel and the pinion and including a ratchet mechanism, said ratchet mechanism being so arranged that the rack may move freely toward the limit stop without imparting motion to the gearing.

10. In a motor control mechanism, the combination of a plurality of fluid pressure motors of the reciprocating type; a rack bar secured to the piston rod of each motor; an adjustable limit stop co-acting with each of the rack bars and serving to limit the movement thereof in one direction; a shaft mounted for rotation adjacent said rack bars; a pinion loosely mounted on the shaft adjacent each bar and meshing therewith; ratchet mechanism working in conjunction with each pinion to cause the shaft to rotate as the rack bars move away from the limit stop; a constant speed control device; and gearing interposed between the shaft and said speed control device for actuating the latter upon a movement of the shaft produced by the movement of either of the rack bars away from its limit stop.

11. In an automatic circuit maker and breaker, the combination of a reversible motor; a constant speed control mechanism; connections between said mechanism and a movable element of the motor allowing said element to move free of control in one direction only and contacts adapted to be closed by the movement of said element upon the completion of its controlled movement.

12. In an automatic circuit maker and breaker, the combination of a reversible motor; a piston rod extending from the piston thereof; a constant speed control mechanism; connections between said rod and the control mechanism allowing the rod to move free of control in one direction only and contacts adapted to be closed by the movement of said rod upon completion of its controlled movement.

In testimony whereof I have signed my name to this specification.

HENRY C. A. MEYER.